US012630158B2

(12) United States Patent
Nishimoto

(10) Patent No.: US 12,630,158 B2
(45) Date of Patent: May 19, 2026

(54) VEHICLE CONTROL DEVICE

(71) Applicant: TOTOTA JIDOSHA KABUSHIKI KAISHA, Toyota (JP)

(72) Inventor: Tatsuya Nishimoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 123 days.

(21) Appl. No.: 18/582,955

(22) Filed: Feb. 21, 2024

(65) Prior Publication Data

US 2024/0317226 A1 Sep. 26, 2024

(30) Foreign Application Priority Data

Mar. 24, 2023 (JP) ................................. 2023-048448

(51) Int. Cl.
*B60W 30/16* (2020.01)

(52) U.S. Cl.
CPC ......... *B60W 30/16* (2013.01); *B60W 2552/30* (2020.02); *B60W 2554/802* (2020.02); *B60W 2554/804* (2020.02); *B60W 2720/10* (2013.01); *B60W 2754/30* (2020.02); *B60W 2754/50* (2020.02)

(58) Field of Classification Search
CPC .......................... B60W 30/16; B60W 2552/30
See application file for complete search history.

(56) References Cited

U.S. PATENT DOCUMENTS

| | | | |
|---|---|---|---|
| 8,355,851 B2 | 1/2013 | Inoue et al. | |
| 8,370,040 B2 | 2/2013 | Inoue et al. | |
| 8,417,430 B2 | 4/2013 | Saeki | |
| 8,548,709 B2 | 10/2013 | Morita | |
| 8,768,597 B2 | 7/2014 | Kagawa | |
| 9,174,643 B2 | 11/2015 | Aso | |
| 10,017,178 B2 | 7/2018 | Morimoto et al. | |
| 10,118,617 B2 | 11/2018 | Urano et al. | |
| 10,486,698 B2 | 11/2019 | Masui et al. | |
| 2019/0295419 A1 | 9/2019 | Tosa et al. | |
| 2021/0261149 A1* | 8/2021 | Doi ......................... | B60K 35/29 |
| 2022/0379727 A1* | 12/2022 | Yokoyama ............. | B60K 35/22 |

FOREIGN PATENT DOCUMENTS

JP 2021-133777 A 9/2021

* cited by examiner

*Primary Examiner* — Imran K Mustafa
(74) *Attorney, Agent, or Firm* — Sughrue Mion, PLLC

(57) ABSTRACT

The processor, under circumstances where both the first and second conditions that decelerate the own vehicle are met, and deceleration control triggered by the establishment of the first condition is being preferentially executed, controls the image display. This happens when the first target involved in the establishment of the first condition is located outside a specific area extending forward from the own vehicle, which is a part of the detection area of the forward sensor and set as an area visible to the driver. Simultaneously, if the second target involved in the establishment of the second condition is located inside this specific area, the processor displays the second information about the second target on the image display device and does not display the first information about the first target.

15 Claims, 5 Drawing Sheets

| Priority Deceleration Control | Position of the Preceding Vehicle | Display Image |
|---|---|---|
| First Deceleration Control | A1 | Preceding Vehicle |
| First Deceleration Control | A2 | Curve |
| Second Deceleration Control | A1 | Curve |
| Second Deceleration Control | A2 | Curve |

FIG.3

VEHICLE CONTROL DEVICE

BACKGROUND OF THE INVENTION

The present invention relates to a vehicle control device that displays information about an object involved in the met condition, during the execution of automatic deceleration control that automatically decelerates the own vehicle when a predetermined condition is met.

DESCRIPTION OF THE RELATED ART

A vehicle control device has been proposed that displays information involved in the met condition, during the execution of automatic deceleration control that automatically decelerates the own vehicle when a predetermined condition is met (for example, refer to Patent Document 1 below). The vehicle control device described in Patent Document 1 (hereinafter referred to as 'conventional device') includes a display device and a processor. The processor, upon recognizing that the traffic light color ahead of the own vehicle is 'red', determines that a condition (first condition) for decelerating the own vehicle is met. In this case, the processor starts deceleration control to stop the own vehicle before the traffic light and displays an image representing the traffic light, the object involved in the met first condition, on the display device. Also, the processor, recognizing another vehicle (preceding vehicle) traveling in front of the own vehicle, determines that a condition (second condition) for decelerating the own vehicle is met. In this case, it starts deceleration control to avoid collision with the other vehicle and displays an image (icon) representing the preceding vehicle, the object involved in the met second condition, on the display device.

Patent Document 1: Japanese Patent Laid-Open No. 2021-133777

SUMMARY

As in conventional devices, where multiple types of conditions for executing deceleration control are predefined, situations may arise where two different conditions are met simultaneously. For example, a situation where the first condition is met triggered by the detection of the first object by an onboard sensor, and simultaneously, the second condition is met triggered by the detection of the second object. In such situations, images representing both the first and second objects will be displayed on the display device. However, if the driver can visually recognize the first object but not the second, the driver may not understand what the displayed second object signifies, potentially causing discomfort.

One of the objectives of the present invention is to provide a vehicle control device that can suppress discomfort in the driver when providing information related to deceleration control.

To achieve the above objective, the vehicle control device (1) of the present invention includes a front sensor (21, 22, 23) that acquires information about objects existing in front of the own vehicle (V), a vehicle sensor (24) that acquires information about the running state of the own vehicle (vs), a display device (40) that displays images, and a processor (10) that executes deceleration control to decelerate the own vehicle and image display control to display information about the object involved in (pertinent to) the met deceleration condition on the display device when certain deceleration conditions (X1, X1a, X2) based on information acquired from the front sensor and the vehicle sensor are met. The processor is configured such that, in a situation where the first and second conditions for decelerating the own vehicle are met simultaneously and deceleration control triggered by the met first condition is being executed preferentially, if the first object involved in the met first condition is located outside (A2) a specific area (A1) set as a visually recognizable area for the driver of the own vehicle, extending in front of the own vehicle within the detection area (A0) of the front sensor, and the second object involved in the met second condition is located inside the specific area, the processor displays the second information about the second object on the display device and does not display the first information about the first object.

When both the first and second conditions are met simultaneously, and the processor is preferentially executing the first deceleration control, a situation is assumed where the first object is located outside a specific area, and the second object is inside it. In this situation, it is highly likely that the driver will find it difficult to visually recognize the first object but easier to recognize the second one. Therefore, the processor displays an image representing the second object involved in the met second condition, instead of the first object involved in the met first condition. Consequently, the vehicle control device according to the present invention can suppress any discomfort in the driver when providing information related to deceleration control. Also, under the situation where both the first and second conditions are met simultaneously, displaying images related to both the first and second objects simultaneously would require a relatively large display area. In contrast, the vehicle control device according to this embodiment only displays the image of the object easier for the driver to recognize, hence a large display area is not necessary.

In one embodiment of the vehicle control device of the present invention, the processor is configured such that:

when only the first condition is met, determines the first target speed value (vdx1) for the own vehicle and executes the first deceleration control to control the own vehicle such that its actual speed matches the first target speed value;

when only the second condition is met, determines the second target speed value (vdx2) for the own vehicle and executes the second deceleration control to control the own vehicle such that its actual speed matches the second target speed value;

when both the first and second conditions are met simultaneously, and the first target value is equal to or less than the second target value, executes the first deceleration control.

This allows the first deceleration control to be preferentially executed when both the first and second conditions are met simultaneously, and the first target value is equal to or less than the second target value.

In another embodiment of the vehicle control device of the present invention, the first condition is met when the relative position and speed between the own vehicle and a preceding vehicle (PV) meet a predetermined criterion, and the second condition is met when the relationship between the target speed value (vdx2) for the own vehicle, determined based on the relative position to a curve road (C) and the curve radius of the curve road, and the actual speed (vs) of the own vehicle meets a predetermined criterion.

Thus, it is possible to avoid collision (excessive approach) between the own vehicle and the preceding vehicle, and safely navigate the own vehicle along the curve road.

In another embodiment of the vehicle control device of the present invention, the first object is the preceding vehicle, and the second object is the curve road.

This allows the driver to recognize that deceleration control is being executed triggered by the presence of either the preceding vehicle or the curve road.

In another embodiment of the vehicle control device of the present invention, the first information is an image representing the preceding vehicle, and the second information is an image representing the curve road.

Accordingly, this allows the driver to intuitively recognize the object that triggers the deceleration control.

BRIEF DESCRIPTION OF THE DRAWINGS

FIG. 3 is a table for selecting the image to be displayed when conditions X1 and X2 are met simultaneously.

DESCRIPTION OF THE EMBODIMENTS (Overview) The vehicle control device 1 according to one embodiment of the present invention, equipped in a vehicle V (hereinafter referred to as "own vehicle") with an automatic driving function, has an automatic braking function that controls the braking device of the own vehicle to decelerate it when certain conditions are met, regardless of whether the automatic driving function is activated or deactivated (when the driver is actively operating the vehicle).

Figure 1:
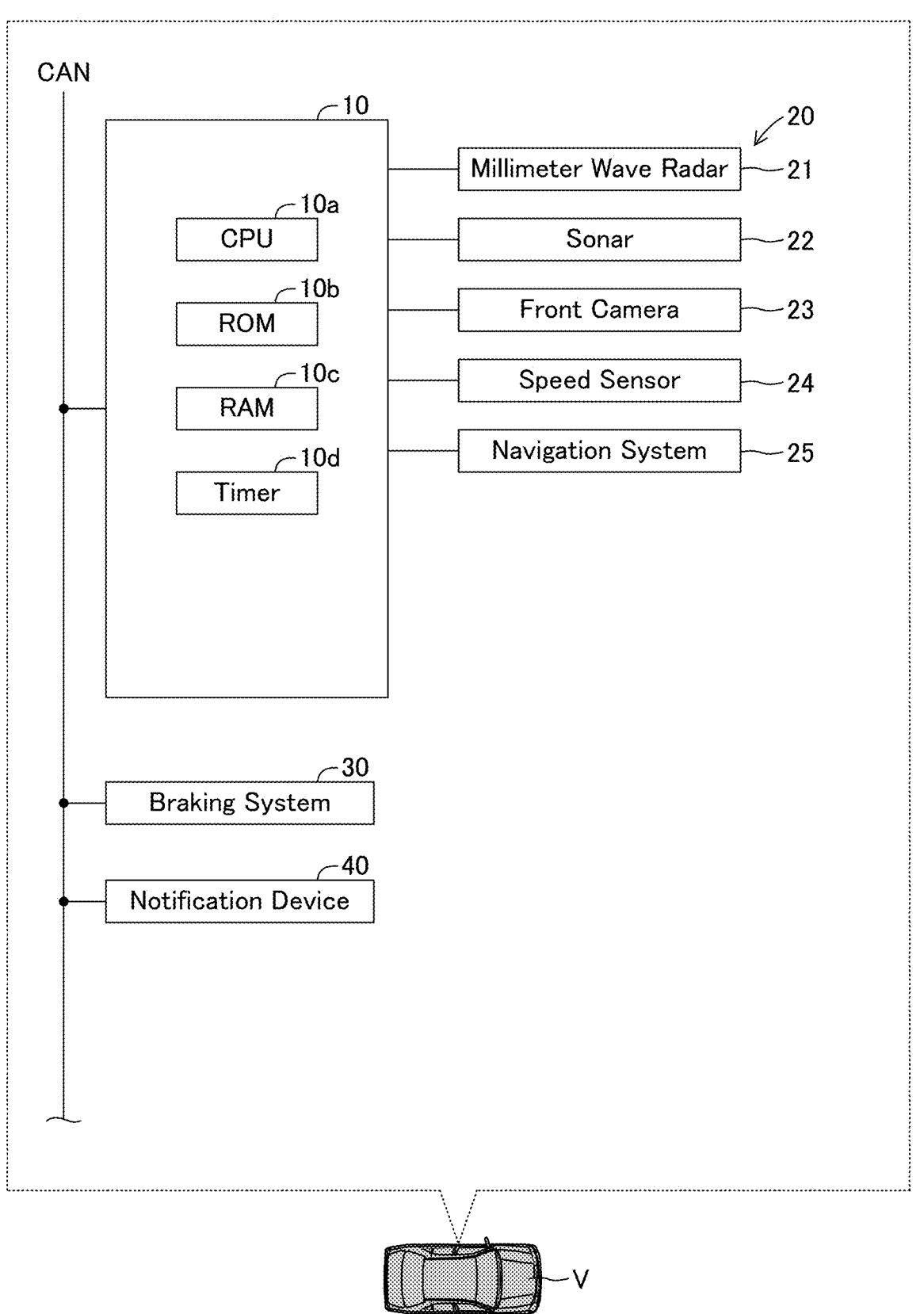
FIG. 1 is a block diagram of a vehicle control device according to one embodiment of the present invention.

(Specific Configuration) As shown in FIG. 1, the vehicle control device 1 comprises a driving assistance ECU 10, onboard sensors 20, a braking device 30, and a notification device 40.

The driving assistance ECU 10 includes a microcomputer with a CPU 10a, ROM 10b, RAM 10c, timer 10d, etc. The driving assistance ECU 10 is connected to other ECUs equipped in the own vehicle via a CAN (Controller Area Network).

The onboard sensors 20 include forward sensors that acquire information about objects (other vehicles, guardrails, etc.) located in front of the own vehicle. Specifically, the onboard sensors 20 include a millimeter-wave radar 21, a sonar 22, and a forward-facing camera 23 as forward sensors.

The millimeter-wave radar 21 comprises a transmitting and receiving unit and a signal processing unit (not shown). The transmitting and receiving unit emits millimeter radio waves (hereinafter referred to as "millimeter waves") towards the front of the own vehicle and receives millimeter waves reflected by solid objects within the emission range. The emission range of the millimeter waves is approximately fan-shaped in a plan view. The signal processing unit calculates the distance between the own vehicle and the object, the speed of the object, etc., based on the time taken from emitting to receiving the reflected waves, the phase difference between the transmitted and received waves, and the attenuation level of the reflected waves, and sends these calculation results to the driving assistance ECU 10.

The sonar 22 intermittently emits ultrasonic waves into the surrounding area of the own vehicle and receives the ultrasonic waves reflected by solid objects. Based on the time taken from transmitting to receiving the reflected waves, the sonar 22 recognizes the distance between the own vehicle and the solid object, the relative position (direction) of the solid object to the own vehicle, etc., and sends these recognition results to the driving assistance ECU 10.

The forward-facing camera 23 includes an imaging device and an image analysis device. The imaging device, for example, is a digital camera incorporating an imaging element such as a CCD (charge-coupled device) or a CIS (CMOS image sensor). The imaging device is positioned at the top of the front windshield, facing forward. It captures the scene in front of the own vehicle at a predetermined frame rate and acquires image data. The imaging device transmits the image data to the image analysis device, which analyzes the acquired image data to obtain information about objects located in front of the own vehicle. For instance, the image analysis device identifies (recognizes) the type of object located in front of the own vehicle, such as other vehicles or guardrails, and transmits the identification results to the driving assistance ECU 10.

Furthermore, the onboard sensors 20 include a vehicle sensor that acquires information about the running state (speed) of the own vehicle. Specifically, as shown in FIG. 1, the onboard sensors 20 include a speed sensor 24 as a vehicle sensor.

The speed sensor 24 detects the rotational speed (wheel speed) of each wheel and calculates the speed vs (actual vehicle speed) of the own vehicle based on the wheel speeds. The speed sensor 24 transmits data representing the speed vs to the driving assistance ECU 10.

Additionally, the onboard sensors 20 include a navigation system 25. The navigation system 25 acquires the position (latitude and longitude) of the own vehicle based on GPS signals. Moreover, the navigation system 25 stores map information including information about roads (for example, the curvature (curve radius) of curve road C), the position of traffic lights, and the position of stop lines. The navigation system 25 transmits the own vehicle's position information and map information to the driving assistance ECU 10.

The braking device 30 applies braking force to the wheels (brake discs). The braking device 30 includes a brake ECU, brake calipers, etc. The brake calipers include actuators that press the brake pads against the brake discs. The brake ECU acquires information (control signal) representing the target braking force from other ECUs and drives the actuator of the brake calipers based on this information. In this way, the braking force applied to the wheels (brake discs) is controlled.

The notification device 40 includes an image display device. The notification device 40, for example, is incorporated into the instrument panel of the own vehicle. As described later, while the driving assistance ECU 10 is executing automatic braking control, the notification device 40 displays images representing the objects involved in the met conditions for executing the automatic braking control (the first and second deceleration controls mentioned later) according to the image display instructions received from the driving assistance ECU 10.

(Automatic Braking Function) The driving assistance ECU 10 executes automatic braking control when it detects that at least one of several types of conditions X for decelerating the own vehicle (for example, the conditions X1 and X2 mentioned below) is met, based on information acquired from the forward sensors (millimeter-wave radar 21, sonar 22, and forward-facing camera 23), speed sensor 24, and navigation system 25. In the automatic braking control, the driving assistance ECU 10 determines a target value vd for the speed vs of the own vehicle and controls the braking device 30 so that the actual speed vs of the own vehicle matches the target (desired) value vd. As described in detail later, the driving assistance ECU 10 determines the target value vd according to the met condition X (condition X1 and/or X2).

<Condition X1> The distance Δd1 between the own vehicle and a preceding vehicle PV traveling in the same lane as the own vehicle is below a threshold Δd1th, and the speed vs of the own vehicle is greater than the speed v0 of the preceding vehicle PV.

<Condition X2> The own vehicle is traveling on a curve road C (or is about to enter the curve road C), and the speed vs of the own vehicle is greater than the target value vdx2.

Here, "just before the own vehicle enters the curve road C" refers to a situation where curve road C exists in front of the own vehicle and the distance Δd2 between the start of curve road C and the own vehicle is below a threshold Δd2th. The driving assistance ECU 10 acquires (calculates) the target value vdx2 based on the curve radius R. For example, the driving assistance ECU 10 refers to a table (not shown) that shows the relationship between the curve radius and the target value vdx2 to determine the target value vdx2. Note that the larger the curve radius, the larger the target value vdx2.

When Condition X1 is solely met, the driving assistance ECU 10 adopts a speed value lower than the speed v0 of the preceding vehicle PV as the target value vdx1. For example, a speed value that is a predetermined value Δdv less than the speed v0 is adopted as the target value vdx1 (=v0−Δdv). The driving assistance ECU 10 then controls the braking device 30 so that the actual speed vs of the own vehicle matches the target value vdx1. More specifically, the driving assistance ECU 10 controls the braking device 30 such that the acceleration G (deceleration) of the own vehicle matches a predetermined target value (an acceleration level that is not uncomfortable for the occupants). This acceleration (deceleration) is determined based on the distance between the own vehicle and the preceding vehicle PV, the speed vs of the own vehicle, etc. This results in the automatic braking of the own vehicle. Consequently, the distance Δd1 between the own vehicle and the preceding vehicle PV gradually increases, thereby avoiding a collision (excessive approach) between the own vehicle and the preceding vehicle PV. In the following description, the above control (control to avoid a collision (excessive approach) between the own vehicle and the preceding vehicle PV) is referred to as "the first deceleration control."

As described above, when Condition X1 is solely met, the driving assistance ECU 10 executes the first deceleration control. At this time, the driving assistance ECU 10 causes the notification device 40 to display an image (icon) representing the preceding vehicle PV, which is the object involved in the met Condition X1. This allows the driver to recognize that "the own vehicle is automatically braking due to its approach to the preceding vehicle."

When Condition X2 is solely met, the driving assistance ECU 10 controls the braking device 30 such that the actual speed vs of the own vehicle matches the target value vdx2, thus decelerating the own vehicle. This allows the own vehicle to safely travel along curve road C. In the following description, the above control (control to safely travel the own vehicle along curve road C) is referred to as "the second deceleration control."

As described above, when Condition X2 is solely met, the driving assistance ECU 10 executes the second deceleration control. At this time, the driving assistance ECU 10 causes the notification device 40 to display an image (icon) representing curve road C, which is the object involved in the met Condition X2. This allows the driver to recognize that "the own vehicle is automatically braking because it is traveling on (or about to enter) curve road C."

In a situation where both Conditions X1 and X2 are met, the driving assistance ECU 10 controls the braking device 30 and the notification device 40 as follows.

The driving assistance ECU 10 acquires (calculates) the target values vdx1 and vdx2, similar to the situation where each condition is met solely. It adopts the smaller of the target values vdx1 and vdx2 as the target value vdx12. The driving assistance ECU 10 then controls the braking device 30 so that the actual speed vs of the own vehicle matches the target value vdx12. For instance, if the target value vdx1 is smaller than the target value vdx2, the driving assistance ECU 10 controls the braking device 30 so that the speed vs of the own vehicle matches the target value vdx1. In this case, the driving assistance ECU 10 prioritizes executing the first deceleration control, which decelerates the own vehicle to avoid a collision (excessive approach) with the preceding vehicle PV. Conversely, if the target value vdx2 is smaller than the target value vdx1, the driving assistance ECU 10 controls the braking device 30 so that the speed vs of the own vehicle matches the target value vdx2. In this case, the driving assistance ECU 10 prioritizes executing the second deceleration control, which decelerates the own vehicle so it can safely travel along curve road C. If the target values vdx1 and vdx2 are equal, the driving assistance ECU 10 executes the first deceleration control.

Figure 2A:
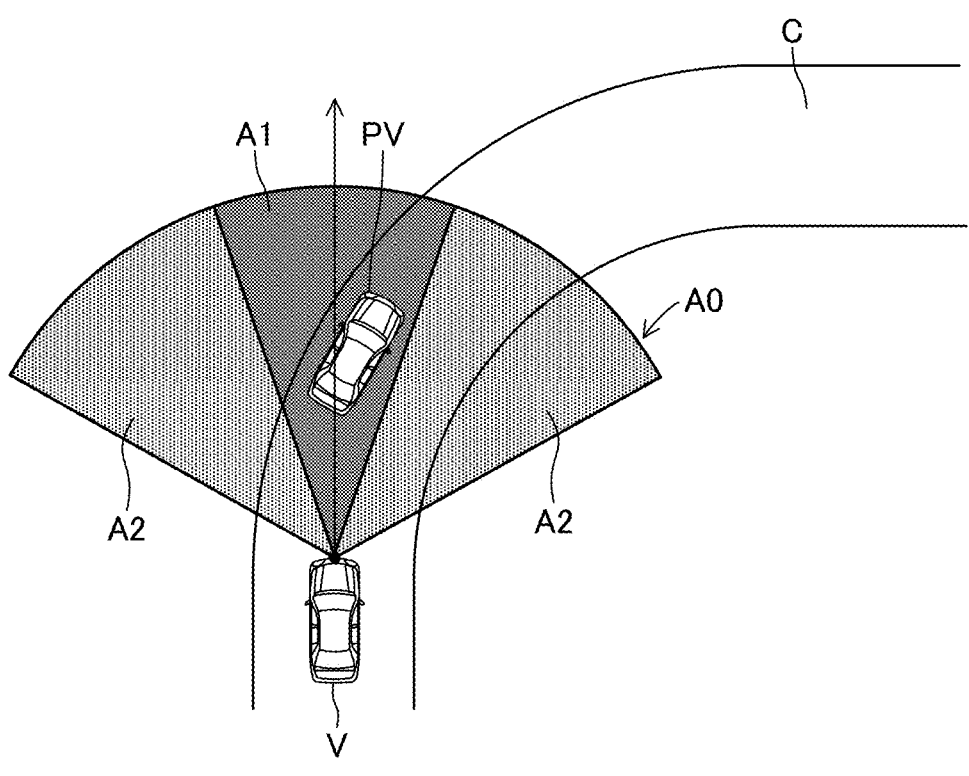
FIG. 2A is a plan view showing a situation where both the first and second conditions are met simultaneously and the first deceleration control is preferentially executed, with the preceding vehicle located within area A1.
Figure 2B:
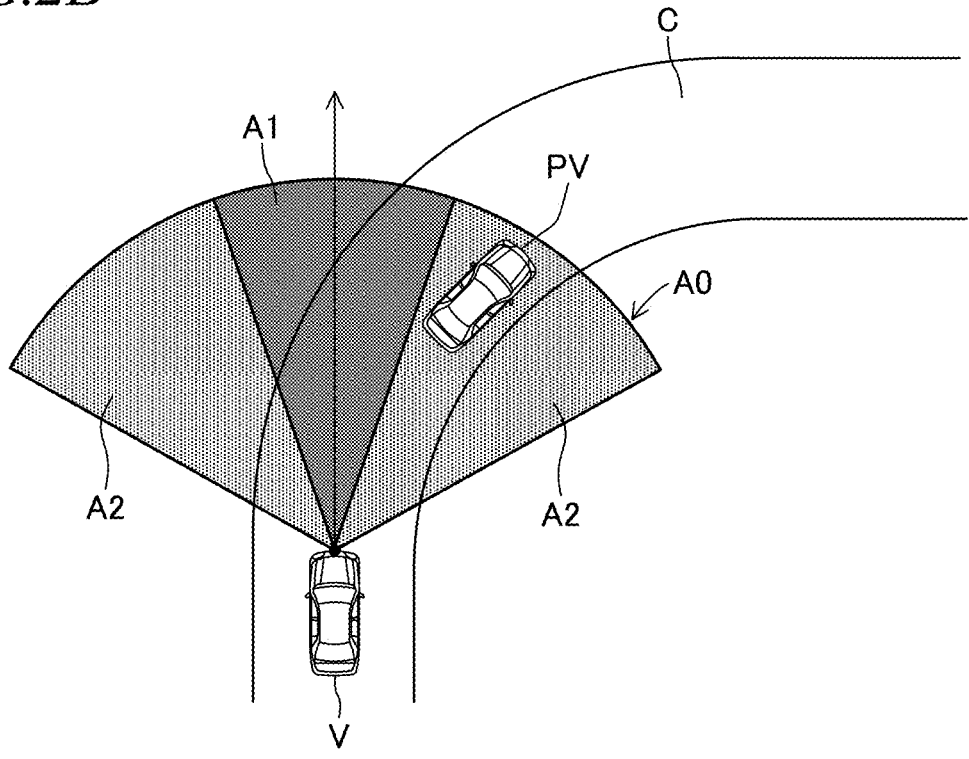
FIG. 2B is a plan view showing a situation where both the first and second conditions are met simultaneously and the first deceleration control is preferentially executed, with the preceding vehicle located within area A2.

As shown in FIGS. 2A and 2B, the area A0 where the forward sensor (e.g., millimeter-wave radar 21) can accurately detect objects is a fan-shaped area extending forward from the vehicle, with the sensor's location as the vertex in a plan view. The line connecting the midpoint of the arc to the vertex of the fan shape that defines area A0 roughly aligns with the vehicle's longitudinal axis. The central angle of the fan shape defining area A0, which is the field of view of the forward sensor, is, for example, 120 degrees. The area A1 that the driver can visually recognize easily is a fan-shaped area that also extends forward from the vehicle, with the driver's location as the vertex. The line connecting the midpoint of the arc to the vertex of the fan shape defining area A1 also roughly aligns with the vehicle's longitudinal axis. The central angle of the fan shape defining area A1, the driver's field of view, is smaller than that of the fan shape defining area A0. For example, the central angle of the fan shape defining area A1 is 30 degrees. As shown in FIGS. 2A and 2B, area A1 is encompassed within area A0. Area A1 is predefined as a specific area within area A0. Area A2 is the part of area A0 excluding area A1. Thus, area A0 is composed of areas A1 and A2.

In situations where both Conditions X1 and X2 are met and the driving assistance ECU 10 is prioritizing the execution of the first deceleration control, the ECU determines the image to be displayed on the notification device 40 based on the location (either area A1 or A2) of the preceding vehicle PV, which is the object involved in the met Condition X1. Specifically, as shown in FIG. 2A, if the preceding vehicle PV is located within area A1, the driving assistance ECU 10 displays an image (icon) representing the preceding vehicle PV on the notification device 40. Conversely, as shown in FIG. 2B, if the preceding vehicle PV is located within area A2, the driving assistance ECU 10 displays an image (icon) representing curve road C. Whether the preceding vehicle PV is located within area A1 can be determined based on the information about the position of the preceding vehicle PV obtained from the forward sensor.

In both situations shown in FIGS. 2A and 2B, the driving assistance ECU 10 executes the first deceleration control, which decelerates the own vehicle to increase the distance Δd1 between the own vehicle and the preceding vehicle PV beyond the threshold Δd1th. In the situation shown in FIG. 2A, the preceding vehicle PV is located within the range easily visible to the driver (within area A1). Therefore, when the image representing the preceding vehicle PV is displayed on the notification device 40, the driver can recognize that deceleration control is being executed because of the presence of the preceding vehicle PV.

On the other hand, in the situation shown in FIG. 2B, the preceding vehicle PV is located outside the range easily visible to the driver (outside area A1, in area A2). In such a case, if the image representing the preceding vehicle PV is displayed on the notification device 40, the driver may not be able to understand what the displayed image means. Therefore, in the situation shown in FIG. 2B, the driving assistance ECU 10 displays an image (icon) representing curve road C, which is the object involved in the met Condition X2 and located within the range easily visible to the driver, on the notification device 40.

FIG. 3 is a table for selecting images to be displayed on the notification device 40 by the driving assistance ECU 10 when both Conditions X1 and X2 are met. According to FIG. 3, when the prioritized deceleration control is the first deceleration control and the preceding vehicle PV is located within area A1 (as shown in FIG. 2A), the driving assistance ECU 10 selects the preceding vehicle as the display image. Also, when the prioritized deceleration control is the first deceleration control and the preceding vehicle PV is located within area A2 (as shown in FIG. 2B), the driving assistance ECU 10 selects curve road C as the display image. Furthermore, when the prioritized deceleration control is the second deceleration control, curve road C is selected as the display image regardless of the position of the preceding vehicle PV.

Figure 4:
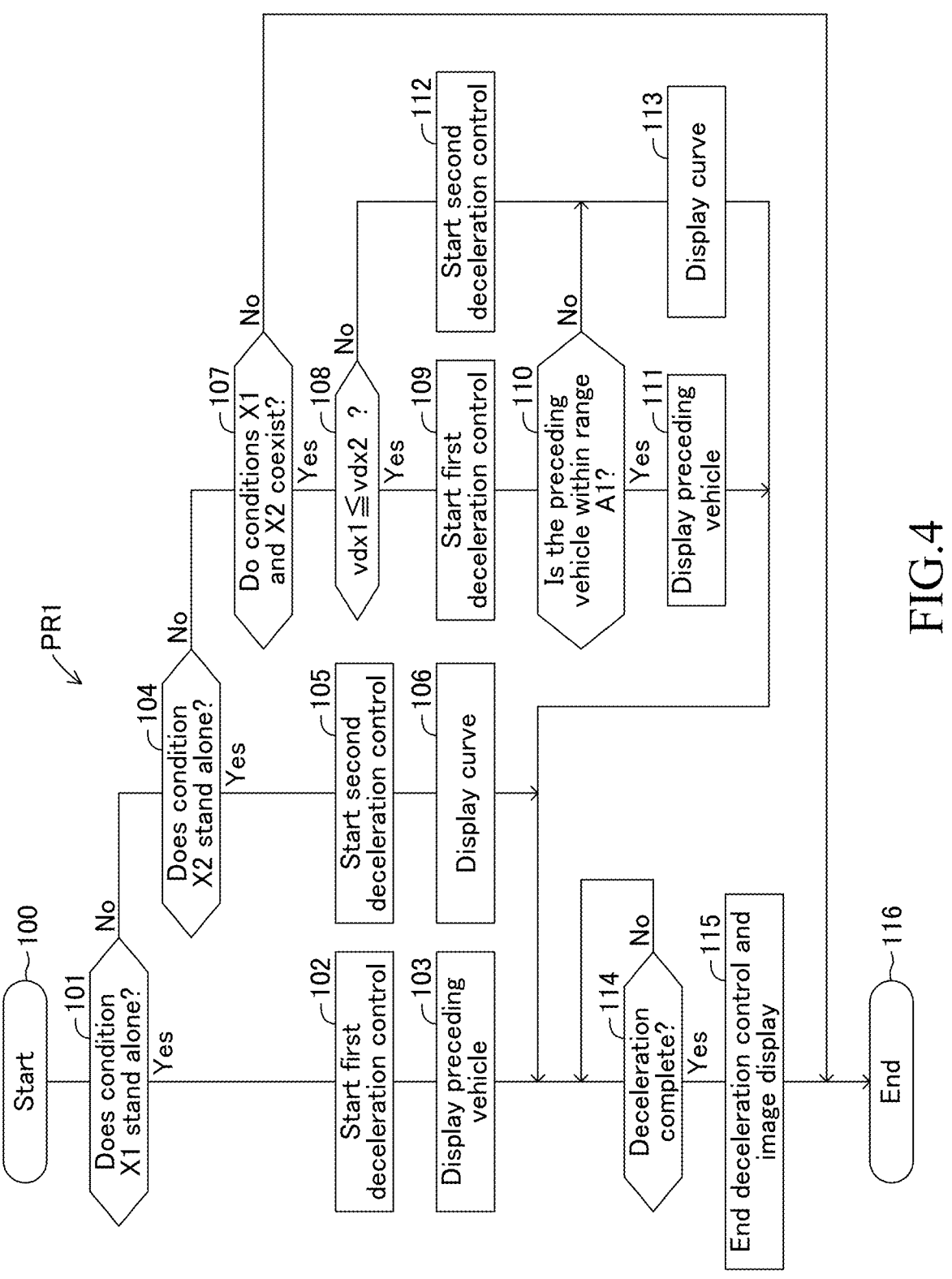
FIG. 4 is a flowchart of a program for implementing the automatic deceleration function.

Next, referring to FIG. 4, the program PR1 executed by the CPU 10a (hereinafter simply referred to as "CPU") to realize the automatic deceleration function is described. When the ignition switch of the own vehicle is in the on state, the CPU starts executing program PR1 at predetermined intervals. The CPU starts executing program PR1 from step 100 and proceeds to step 101.

At step 101, the CPU determines whether Condition X1 is met solely. If the CPU determines that Condition X1 is met solely (101: Yes), it proceeds to step 102. Otherwise (101: No), it proceeds to step 104, which will be described later.

At step 102, the CPU obtains the target value vdx1 and starts executing the first deceleration control based on the obtained target value vdx1. Then, it proceeds to step 103.

At step 103, the CPU causes the notification device 40 to display an image representing the preceding vehicle PV. Subsequently, the CPU proceeds to step 114, which will be described later.

If the CPU proceeds from step 101 to step 104, at step 104 it determines whether Condition X2 is met solely. If the CPU determines that Condition X2 is met solely (104: Yes), it proceeds to step 105. Otherwise (104: No), it proceeds to step 107, which will be described later.

At step 105, the CPU obtains the target value vdx2 and starts executing the second deceleration control based on the obtained target value vdx2. Then, it proceeds to step 106.

At step 106, the CPU causes the notification device 40 to display an image representing curve road C. After that, the CPU proceeds to step 114, which will be described later.

If the CPU proceeds from step 104 to step 107, at step 107 it determines whether both Conditions X1 and X2 are met simultaneously. If the CPU determines that both Conditions X1 and X2 are met simultaneously (107: Yes), it proceeds to step 108. Otherwise (107: No), it proceeds to step 116, where it ends the execution of program PR1.

If the CPU proceeds from step 104 to step 107, at step 107, it determines whether both Conditions X1 and X2 are simultaneously met. If the CPU determines that both Conditions X1 and X2 are met (107: Yes), it proceeds to step 108. Otherwise (107: No), it proceeds to step 116 to end the execution of program PR1.

At step 108, the CPU obtains the target values vdx1 and vdx2 and determines whether the obtained target value vdx1 is less than or equal to target value vdx2. If the CPU determines that the target value vdx1 is less than or equal to vdx2 (108: Yes), it proceeds to step 109. Otherwise (108: No), it proceeds to step 112, which will be described later.

At step 109, the CPU starts executing the first deceleration control based on the target value vdx1 and then proceeds to step 110.

At step 110, the CPU determines whether the preceding vehicle PV is located within area A1. If it determines that the preceding vehicle PV is within area A1 (110: Yes), it proceeds to step 111. Otherwise (110: No), it proceeds to step 113, which will be described later.

At step 111, the CPU causes the notification device 40 to display an image representing the preceding vehicle PV. Then, it proceeds to step 114, which will be described later.

If the CPU proceeds from step 108 to step 112, at step 112, it starts executing the second deceleration control based on the target value vdx2 and then proceeds to step 113.

At step 113, the CPU causes the notification device 40 to display an image representing curve road C. Then, it proceeds to step 114, which will be described later.

At step 114, the CPU determines whether the speed vs has reached the target value (either target value vdx1 or vdx2) and whether deceleration is complete. If the CPU determines that the speed vs has reached the target value (114: Yes), it proceeds to step 115. Otherwise (114: No), it returns to step 114.

At step 115, the CPU ends the execution of the deceleration control and the image display by the notification device 40. Then, it proceeds to step 116 and ends the execution of program PR1.

Effect

As described above, in the situation where both Conditions X1 and X2 are met and the driving assistance ECU 10 is prioritizing the first deceleration control, and the preceding vehicle PV involved in the establishment of Condition X1 is located within area A2 while part of curve road C involved in the establishment of Condition X2 is located within area A1 (as shown in FIG. 2B), the driving assistance ECU 10 prioritizes the first deceleration control to avoid a collision between the own vehicle and the preceding vehicle PV. However, since the preceding vehicle PV is located within area A2, it may be difficult for the driver to see it. In contrast, since part of curve road C is located within area A1, it is easier for the driver to see it. Therefore, instead of displaying an image representing the preceding vehicle PV involved in Condition X1, the driving assistance ECU 10 displays an image representing curve road C involved in Condition X2. Thus, the vehicle control device 1 can provide information about deceleration control to the driver without causing discomfort. Additionally, if both Conditions X1 and X2 are met, displaying images of both the preceding vehicle PV and curve road C simultaneously would require a relatively large display area. In contrast, the current embodiment only displays one image (the image of the landmark easier for the driver to recognize), so a large display area is not necessary.

This invention is not limited to the embodiments described above and can adopt various modifications within the scope of the invention.

Modification Example 1

The conditions for starting deceleration control by the Driving Assistance ECU 10 are not limited to those in the aforementioned embodiment. For example, deceleration control can be executed when Condition X1a is met instead of Condition X1.

<Condition X1a> the Traffic Light S in Front of the Own Vehicle is Red.

Figure 5:
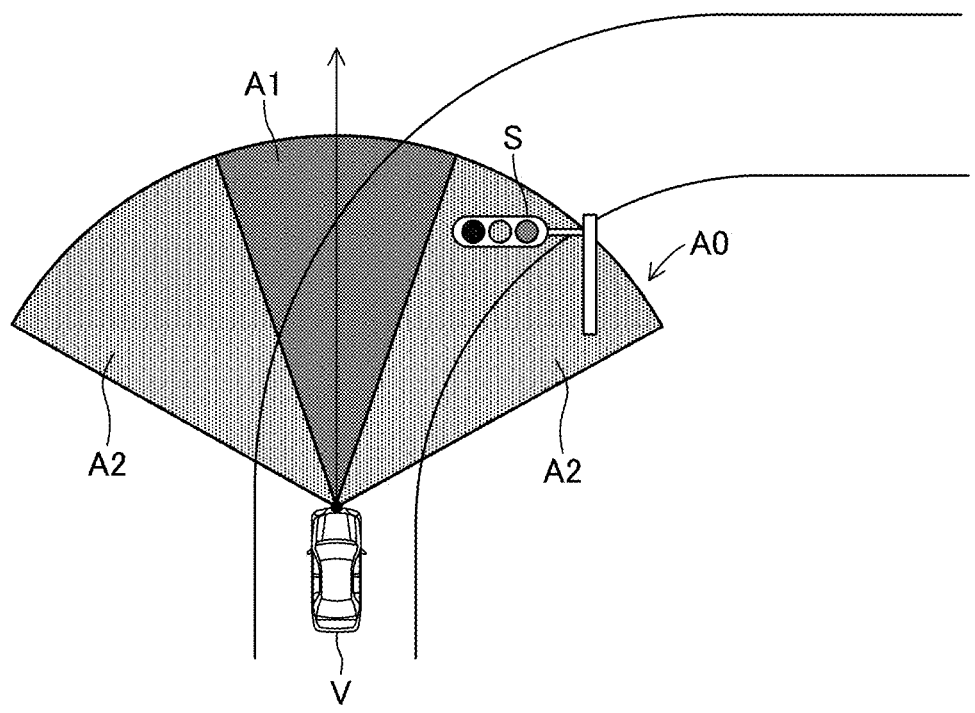
FIG. 5 is a plan view showing a situation where the traffic light is located within area A2.

When Condition X1a is met, the target speed vdx1a is "0". That is, the Driving Assistance ECU 10 can decelerate the vehicle to stop it before the traffic light S. When Condition X1a is met alone, the Driving Assistance ECU 10 displays an image representing the traffic light S on the notification device 40. Moreover, as shown in FIG. 5, in a situation where both Condition X1a and Condition X2 are met and the traffic light S is located in Area A2, the Driving Assistance ECU 10 displays an image representing the curved road C on the notification device 40 and does not display an image of the traffic light S.

Modification Example 2

In the aforementioned embodiment, Area A1 corresponds to the central part of Area A0, i.e., it is fan-shaped. Instead, a rectangular area extending in front of the own vehicle and the overlapping part with Area A0 can be adopted as Area A1.

Modification Example 3

As described above, when both Conditions X1 and X2 are met and the Driving Assistance ECU 10 is preferentially executing the first deceleration control, and if the preceding vehicle PV is located in Area A1, the Driving Assistance ECU 10 displays an image representing the preceding vehicle PV on the notification device 40. Even if the preceding vehicle PV moves from Area A1 to Area A2 in this situation, as long as the Driving Assistance ECU 10 is preferentially executing the first deceleration control, it may continue to display the image of the preceding vehicle PV.

Modification Example 4

In the aforementioned embodiment, the size of Area A1 is fixed (unchanged). Alternatively, the size of Area A1 can be changed according to the speed vs of the own vehicle. For example, Area A1 can be configured to become narrower as the speed vs increases.

What is claimed is:

1. A vehicle control device comprising:
   a forward sensor for acquiring information about an object existing in front of the own vehicle;
   a vehicle sensor for acquiring information regarding a running state of the own vehicle;
   an image display device that:
      displays first information about a first condition to decelerate the own vehicle, the first condition being based on a preceding vehicle, and
      displays second information about a second condition to decelerate the own vehicle, the second condition being based on a road on which the own vehicle is traveling;
   a processor that:
      detects the first condition and the second condition, based on information acquired from the forward sensor and the vehicle sensor,
      based on detecting the first condition, identifies a first target speed for decelerating the own vehicle, and based on detecting the second condition, identifies a second target speed for decelerating the own vehicle,
      upon detecting a deceleration condition to decelerate the own vehicle, based on information acquired from the forward sensor and vehicle sensor, executes deceleration control to decelerate the own vehicle according to the detected deceleration condition and image display control to display information on the image display device about the detected deceleration condition, and;
      in a situation where the first condition and the second condition for decelerating the own vehicle are simultaneously detected, executes:
         deceleration control to decelerate the own vehicle according to a preferred deceleration condition, among the first condition and the second condition, that has a lesser target speed, among the first target speed and the second target speed, and
         image display control to display one of the first information about the first condition or the second information about the second condition, wherein
      the vehicle control device is configured such that, in a situation where the first condition and the second condition for decelerating the own vehicle are simultaneously detected and the deceleration control according to the first condition is being preferentially executed, if the preceding vehicle is located outside a specific area set as a visually recognizable area by the forward sensor, then the processor displays the second information on the image display device and does not display the first information.

2. The vehicle control device according to claim 1, wherein the processor:
   detects the first condition when a relative position and a relative speed between the own vehicle and the preceding vehicle meet a predetermined condition;
   detects the second condition when a relationship between a target speed of the own vehicle determined based on the relative position of the own vehicle and the road on which the vehicle is traveling, and a curve radius of the road, and an actual speed of the own vehicle, meets a predetermined condition.

3. The vehicle control device according to claim 2, wherein:
   the first information is an image representing the preceding vehicle, and

11 the second information is an image representing the road on which the vehicle is traveling.

4. The vehicle control device according to claim 1, wherein the processor:

upon detecting only the first condition to decelerate the own vehicle, based on information acquired from the forward sensor and vehicle sensor, executes deceleration control to decelerate the own vehicle according to the first condition and image display control to display only the first information on the image display device, among the first information and the second information, and upon detecting only the second condition to decelerate the own vehicle, based on information acquired from the forward sensor and vehicle sensor, executes deceleration control to decelerate the own vehicle according to the second condition and image display control to display only the second information on the image display device, among the first information and the second information.

5. The vehicle control device according to claim 1, wherein the vehicle control device is configured such that, in the situation where the first condition and the second condition for decelerating the own vehicle are simultaneously detected and the deceleration control according to the first condition is being preferentially executed, if the preceding vehicle is located inside the specific area set as the visually recognizable area by the forward sensor, then the processor displays the first information on the image display device and does not display the second information.

6. The vehicle control device according to claim 5, wherein the vehicle control device is configured such that, in a situation where the first condition and the second condition for decelerating the own vehicle are simultaneously detected and the deceleration control according to the second condition is being preferentially executed, then the processor displays the second information on the image display device and does not display the first information.

7. The vehicle control device according to claim 6, wherein the processor:

upon detecting only the first condition to decelerate the own vehicle, based on information acquired from the forward sensor and vehicle sensor, executes deceleration control to decelerate the own vehicle according to the first condition and image display control to display only the first information on the image display device, among the first information and the second information, and upon detecting only the second condition to decelerate the own vehicle, based on information acquired from the forward sensor and vehicle sensor, executes deceleration control to decelerate the own vehicle according to the second condition and image display control to display only the second information on the image display device, among the first information and the second information.

8. The vehicle control device according to claim 7, wherein the specific area set as the visually recognizable area by the forward sensor corresponds to a field of view of a driver of the own vehicle.

9. The vehicle control device according to claim 1, wherein the specific area set as the visually recognizable area by the forward sensor corresponds to a field of view of a driver of the own vehicle.

10. A vehicle control device comprising:

a forward sensor for acquiring information about an object existing in front of the own vehicle;

a vehicle sensor for acquiring information regarding a running state of the own vehicle;

an image display device that:

displays first information about a first condition to decelerate the own vehicle, the first condition being based on a preceding vehicle, and displays second information about a second condition to decelerate the own vehicle, the second condition being based on a road on which the own vehicle is traveling;

a processor that:

detects the first condition and the second condition, based on information acquired from the forward sensor and the vehicle sensor, upon detecting the first condition, identifies a first target speed for decelerating the own vehicle, and upon detecting the second condition, identifies a second target speed for decelerating the own vehicle, upon detecting one of the first condition or the second condition, executes deceleration control to decelerate the own vehicle and image display control to display information on the image display device about the detected deceleration condition, and in a state in which the first condition and the second condition are detected at a same time, executes:

deceleration control to decelerate the own vehicle according to a preferred deceleration condition, among the first condition and the second condition, that has a lesser target speed, among the first target speed and the second target speed, and image display control to display one of the first information or the second information on the image display device, wherein based on the preferred deceleration condition corresponding to the first condition, the processor executes the image display control to display, among the first information and the second information, only the second information on the image display device when the preceding vehicle is located outside a specific area set as a visually recognizable area by the forward sensor.

11. The vehicle control device according to claim 10, wherein, based on the preferred deceleration condition corresponding to the first condition, the processor executes the image display control to display, among the first information and the second information, only the first information on the image display device when the preceding vehicle is located inside the specific area set as the visually recognizable area by the forward sensor.

12. The vehicle control device according to claim 11, wherein, based on the preferred deceleration condition corresponding to the second condition, the processor executes the image display control to display, among the first information and the second information, only the second information on the image display device.

13. The vehicle control device according to claim 12, wherein the processor:

upon detecting only the first condition to decelerate the own vehicle, based on information acquired from the forward sensor and vehicle sensor, executes deceleration control to decelerate the own vehicle according to the first condition and image display control to display only the first information on the image display device, among the first information and the second information, and upon detecting only the second condition to decelerate the own vehicle, based on information acquired from the forward sensor and vehicle sensor, executes deceleration control to decelerate the own vehicle according to the second condition and image display control to display only the second information on the image display device, among the first information and the second information.

14. The vehicle control device according to claim 13, wherein the specific area set as the visually recognizable area by the forward sensor corresponds to a field of view of a driver of the own vehicle.

15. The vehicle control device according to claim 10, wherein the specific area set as the visually recognizable area by the forward sensor corresponds to a field of view of a driver of the own vehicle.

\*  \*  \*  \*  \*